Jan. 4, 1966  R. L. PARKER ETAL  3,226,919
SHOCK GATHERING ATTACHMENT FOR A COMBINE
Filed April 15, 1963  3 Sheets-Sheet 1
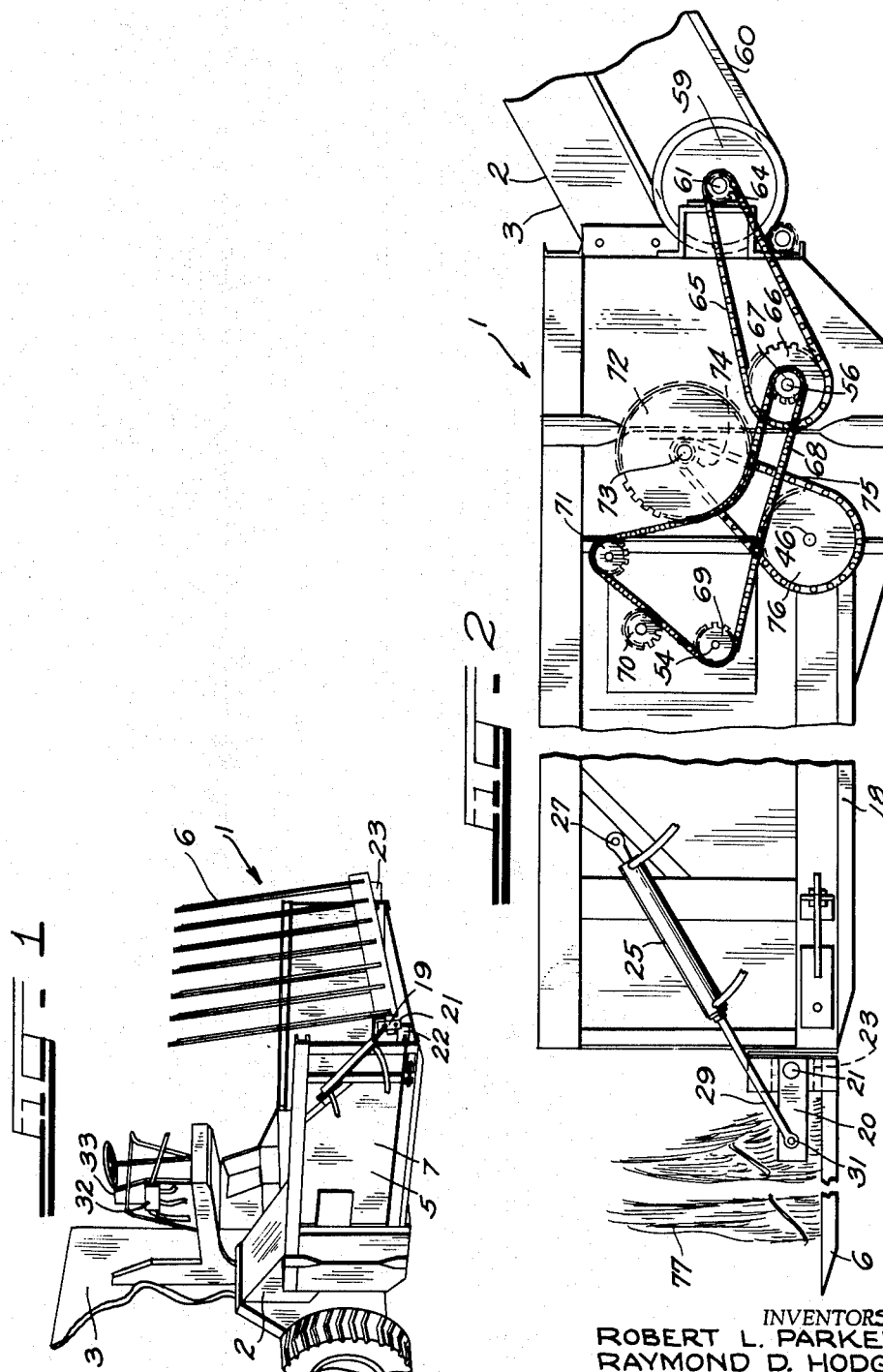
INVENTORS
ROBERT L. PARKER
RAYMOND D. HODGES
BY
Marzall, Johnston, Cook & Root

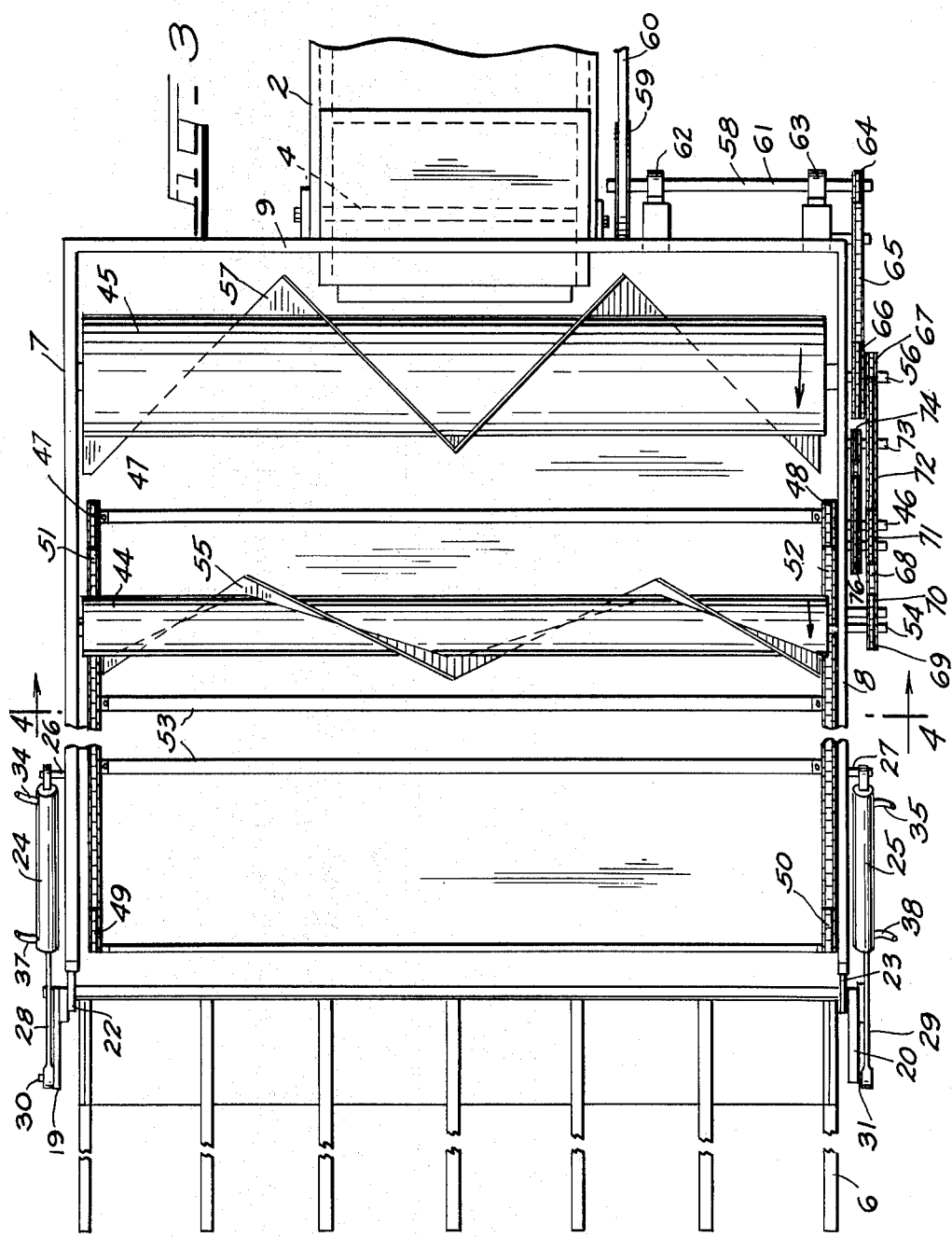

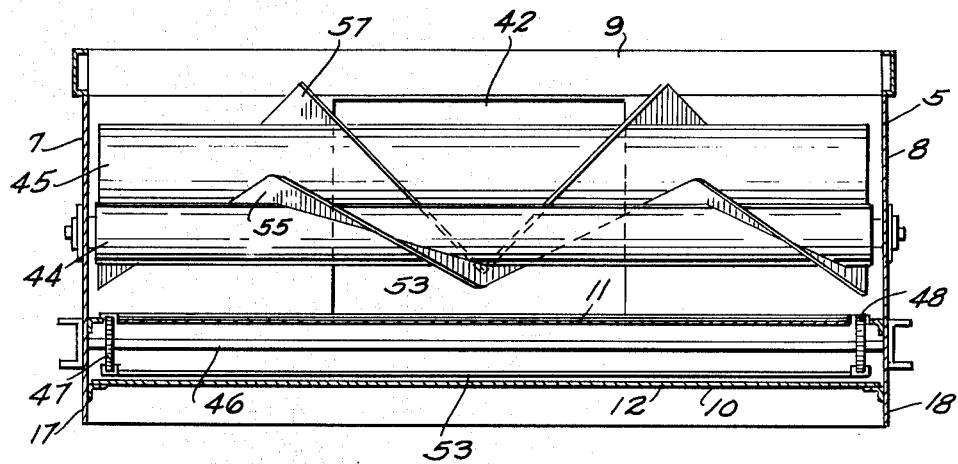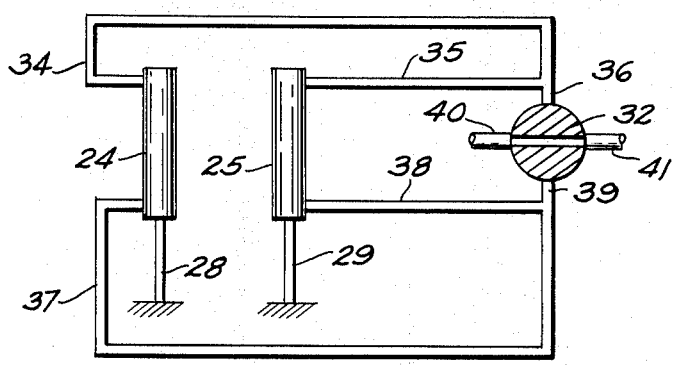

United States Patent Office 3,226,919
Patented Jan. 4, 1966

3,226,919
SHOCK GATHERING ATTACHMENT
FOR A COMBINE
Robert L. Parker, Paris, and Raymond D. Hodges, Muleshoe, Tex., assignors to Texas Sesame Growers, Inc., Paris, Tex., a corporation of Texas
Filed Apr. 15, 1963, Ser. No. 273,020
4 Claims. (Cl. 56—27)

This invention relates to harvesting machinery, and, more particularly to harvesting machinery which is particularly well adapted for use as an attachment for combines for harvesting seed crops, such as, for example, sesame, and the like, from shocks.

It is a primary object of the present invention to enable seed crops, such as sesame, to be harvested from shocks in a novel and expeditious manner.

Sesame is normally harvested from shocks, and the harvesting thereof has heretofore commonly required not only a combine operator, but, in addition, a labor crew of four men for feeding the sesame to the combine. It is an important object of the present invention to enable harvesting to be performed as a one-man operation.

Another object of the present invention is to provide novel harvesting machinery which affords a novel and practical attachment for use on combines.

Another object is to afford a novel self-feeding combine attachment for handling shocks of sesame.

Yet another object is to afford novel harvesting machinery of the aforementioned type which may be used on self-propelled combines now available on the market, and which may be effectively operated and controlled by the single operator of the combine.

A further object is to afford novel harvesting machinery of the aforementioned type which is capable of picking up a shock of sesame, or the like, and feeding it to the elevating mechanism of a combine in such form that the sesame may be readily handled in the combine in a separating operation.

Another object is to afford a novel attachment of the aforementioned type, which may be controlled by the operator of a combine to which it is attached while the operator remains in his normal position on the combine.

A further object is to afford a novel harvesting machine of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a front perspective view of a harvesting machine, embodying the principles of the present invention, showing the machine mounted in operative position on the front of a combine;

FIG. 2 is a fragmentary side elevational view of the harvesting machine and combine shown in FIG. 1;

FIG. 3 is a fragmentary top plan view of the machine and combine shown in FIG. 2;

FIG. 4 is a transverse sectional view taken substantially along the line 4—4 in FIG. 3; and FIG. 5 is a diagrammatic illustration of a portion of a hydraulic system embodied in the harvesting machine shown in FIG. 1.

A harvesting machine 1, embodying the principles of the present invention, is shown in the drawings to illustrate the presently preferred embodiment of the present invention.

The harvesting machine 1 comprises an attachment for a combine, and is adapted to be mounted on the front end of the throat 2 of any one of the several suitable combines now readily available on the market, such as, the self-propelled combine 3, a portion of the front end of which is shown in FIG. 1. As will be discussed in greater detail presently, when the machine 1 is operatively attached to the combine 3, it is operable to pick up shocks of sesame, and the like, and feed the shocks into the elevating mechanism 4, FIG. 3, in the throat 2 for movement by the elevating mechanism 4 into the separating mechanism, not shown, of the combine 3. As will be appreciated by those skilled in the art, elevating mechanisms for feeding grain into a combine, and separating mechanisms for separating the kernels of the grain from the chaff, are common in combines readily available on the market, and are well known, and need not be disclosed in detail herein for the purpose of disclosing the present invention, such mechanisms not forming any part of the present invention except insofar as they may form a part of the entire combination.

The harvesting machine 1 shown in the drawings, includes a box 5 having a loading fork 6 mounted on the front end portion thereof for picking up shocks of sesame, and the like, and dumping them into the box 5. As will be discussed in greater detail hereinafter the machine 1 also includes mechanism for feeding such shocks of grain from the box 5 into the throat 2 of the combine 3 in suitable form for ready handling by the combine 3, as will be discussed in greater detail presently.

The box 5, FIGS. 2, 3, and 4, includes two substantially parallel, upright side walls 7 and 8; an upright rear wall 9 extending between the rear end portions of the side walls 7 and 8, in substantially perpendicular relation thereto; and a double-paneled bottom wall 10, including an upper bottom panel 11 and a lower bottom panel 12 disposed in substantially parallel, vertically spaced relation to each other. Each of the bottom panels 11 and 12 extend between the side walls 7 and 8, and extend from the rear wall 9 to the front of the box 5. The upper bottom panel 11 is supported by supporting brackets 13 and 14 mounted on the side walls 7 and 8, respectively; and the lower bottom panel 12 is mounted on supporting brackets 15 and 16 mounted on the side walls 7 and 8, respectively, below the supporting brackets 13 and 14, FIG. 4. The lower edge portions 17 and 18 of the side walls 7 and 8, respectively, project downwardly below the lower panel 12 of the bottom 10 to afford supporting members, somewhat in the form of runners, for supporting the box 5 on the ground, and the like.

The loading fork 6 includes two substantially T-shaped mounting brackets 19 and 20, FIGS. 2 and 3, rotatably mounted on a shaft 21 extending between and supported by two supporting brackets 22 and 23 projecting forwardly from the lower edge portions of the side walls 7 and 8, respectively of the box 5. Two hydraulic cylinders 24 and 25 are pivotally mounted by suitable pins or bolts 26 and 27, respectively, to the outsides of the side walls 7 and 8, respectively. The cylinders 24 and 25 have pistons 28 and 29 mounted therein, respectively, the pistons 28 and 29 projecting forwardly from the cylinders 24 and 25 and having their free end portions connected by suitable pins or bolts 30 and 31, respectively, to the brackets 19 and 20, respectively. The loading fork 6 and the cylinders 24 and 25 are mounted on the box 5 in such position that when the pistons 28 and 29 are disposed in fully extended position, the loading fork 6 projects forwardly from the lower portion of the front of the box 5 at a slightly downwardly inclined angle, as shown in FIG. 2, and when the pistons 28 and 29 are disposed in fully retracted position in the cylinders 24 and 25 the loading fork 6 is disposed in upwardly extending, and slightly rearwardly tilted position relative to the box 5, as shown in FIG. 1.

Control of the actuation of the pistons 28 and 29 may be effected through any suitable control means such as, for example, a suitable four-way valve 32, FIGS. 1 and 5, located at any suitable position such as, for example, adjacent to the operator's platform 33 on the combine 3. Two suitable conduits, such as hoses 34 and 35, FIGS. 1, 3, and 5, are connected at one end to the rear end portions of the cylinders 24 and 25, respectively, and the other ends of the hoses 34 and 35 are connected to a common outlet connection 36 on the valve 32. Similarly, two other conduits, such as, hoses 37 and 38 are connected at one end to the front end portions of the cylinders 24 and 25, respectively, and the other ends thereof are connected to a common outlet connection 39 on the valve 32, FIG. 5. The valve 32 also includes an exhaust port 40, for discharging hydraulic fluid to sump, and an inlet connection 41, which may be connected to any suitable source of hydraulic fluid, such as, for example, a hydraulic pump, not shown, embodied in the combine 3.

With this construction the loading fork 6 may be moved between the fully raised position shown in FIG. 1 and the fully lowered position shown in FIG. 2 by suitable actuation of the valve 32 by the combine operator while he remains in normal operating position on the platform 33 of the combine 3. Thus, for example, if it is desired to move the loading fork 6 from fully raised position to fully lowered position, the operator may actuate the valve 32 to such position that the connection 39 is connected to the discharge port 40, and the connection 36 is connected to the inlet connection 41, to thereby cause the pistons 28 and 29 to be moved into fully extended position. On the other hand, if it is desired to move the loading fork 6 from fully lowered position to fully raised position, the valve 32 may be actuated into position to connect the connection 36 to the discharge port 40, and connect the connection 39 to the inlet port 41 to thereby cause the pistons 28 and 29 to be moved into fully retracted position.

The rear wall 9 of the box 5 has an opening 42 extending through the central portion thereof. The opening 42 is complementary in size to the open front end of the throat 2 of the combine 3, and the box 5 is mounted on the throat 2 with the front end portion of the throat 2 disposed in the opening 42 in such position that material fed rearwardly through the opening 42 is picked up by the elevating mechanism 4 in the throat 2 and fed into the separating mechanism, not shown, of the combine 3.

As will be discussed in greater detail presently, in the operation of the machine 1, shocks of grain are picked up by the loading fork 6 and dumped into the front end portion of the box 5. The machine 1 also includes mechanism for feeding material from the front end portion of the box 5 rearwardly through the opening 42, such mechanism including a drag conveyor 43; a cutter cylinder 44; and a conveyor drum 45, FIG. 3, as will be discussed in greater detail presently.

The drag conveyor 43 includes an elongated drive shaft 46 extending between, and journaled in the side walls 7 and 8 of the box 5 between the panels 11 and 12 of the floor 10, FIGS. 3 and 4. Two sprocket wheels 47 and 48 are mounted on and secured to the opposite ends of the shaft 46 in inwardly spaced, relatively closely adjacent relation to the side walls 7 and 8, respectively, forwardly of the conveyor drum 45, and rearwardly of the cutter cylinder 44, FIG. 3. Two other sprocket wheels 49 and 50 are journaled on the front end portions of the side walls 7 and 8, respectively, between the panels 11 and 12 of the floor 10, in radial alignment with the sprocket wheels 47 and 48, respectively. The sprocket wheels 47–50 extend upwardly through respective openings in the upper panel 11 of the floor 10. A chain 51 is trained around the sprocket wheels 47 and 49; and a chain 52 is trained around the sprocket wheels 48 and 50, the sprocket wheels 47–50 being so disposed in the box 5 that the upper passes of the chains 51 and 52 are disposed above the panel 11 of the floor 10, and the lower passes of the chains 51 and 52 are disposed between the panels 11 and 12 of the floor 10. A plurality of substantially equally spaced, parallel drag bars 53 are connected between the chains 51 and 52 in substantially perpendicular relation to the side walls 7 and 8 of the box 5, for movement with the chains 51 and 52. During an operation of the machine 1, the shaft 46 is rotated in a clockwise direction, as viewed in FIG. 2, to thereby cause the drag bars 53 to be moved over the top of the floor 10 in a front to rear direction in the box 5, and to be moved in a rear to front direction in the box 5 between the panels 11 and 12 of the floor 10.

The cutter cylinder 44 includes an elongated shaft 54 extending longitudinally therethrough, the shaft 54 extending between, and being journaled in the side walls 7 and 8 of the box 5 in substantially parallel, forwardly and upwardly spaced relation to the shaft 46, FIGS. 2 and 3. The cutter cylinder 44 includes a cutter blade 55 projecting outwardly therefrom, the cutter blade 55 extending around the cutter cylinder 44 in a substantially helical formation from one end to the other end thereof, FIG. 3.

The conveyor drum 45 includes an elongated shaft 56 which extends between and is journaled in the side walls 7 and 8 of the box 5 in substantially parallel, upwardly and rearwardly spaced relation to the shaft 46, FIGS. 2 and 3. The conveyor drum 45 is preferably of the screw conveyor type, having conveyor blades 57 thereon disposed in such position as to feed material inwardly toward the longitudinal center of the conveyor drum 45 from both ends thereof during rotation of the conveyor drum 45.

The machine 1 includes drive mechanism 58 for simultaneously operatively rotating the shafts 46, 54, and 56, and therefore, the drag conveyor 43, the cutter cylinder 44 and the conveyor cylinder 45, in timed relation to each other during an operation of the machine 1. The drive mechanism 58 includes a main drive pulley 59, which may be operatively connected by any suitable means such as a V-belt 60 to a suitable drive, not shown, in the power mechanism of the combine 3. The drive pulley 59 is mounted on and secured to one end portion of a drive shaft 61, which is journaled in suitable bearings 62 and 63 projecting rearwardly from the rear wall 9 of the box 5, FIG. 3. The other end of the shaft 61 extends outwardly beyond the plane of the side wall 8 of the box 5, and has a sprocket wheel 64 mounted thereon in outwardly spaced relation to the plane of the side wall 8. The sprocket wheel 64 is drivingly connected by a chain 65 to a sprocket wheel 66 mounted on and secured to the shaft 56 in radial alignment with the sprocket wheel 64, FIGS. 2 and 3. Another sprocket wheel 67 is mounted on and secured to the shaft 56 outwardly of the sprocket wheel 66, for rotation therewith. The sprocket wheel 67, and, therefore, the drive shaft 56 for the conveyor drum 45 is drivingly connected by a chain 68 to a sprocket wheel 69 mounted on and secured to the shaft 54 of the cutter cylinder 44. The chain 68 is also drivingly connected to three idler pulleys 70, 71, and 72 rotatably mounted on the side wall 8 of the box 5 in radial alignment with the sprocket wheels 66 and 69. The sprocket wheel 72 is mounted on and drivingly connected to a shaft 73 journaled in the side wall 8 of the box 5, and another sprocket wheel 74 is mounted on and secured to the shaft 73, for rotation therewith, inwardly of the sprocket wheel 72. The sprocket wheel 74 is drivingly connected by a chain 75 to a sprocket wheel 76 mounted on and secured to the shaft 46 of the drag conveyor 43.

During an operation of the machine 1, the drive pulley 59 is rotated in a counterclockwise direction, as viewed in FIG. 2. With the drive mechanism 58 constituted and arranged in the manner disclosed herein, such counterclockwise rotation of the pulley 59 is effective to drive the shafts 54 and 56, and, therefore, the cutter cylinder 44 and the conveyor drum 45, in a counterclockwise direction, as viewed in FIG. 2, and to drive the shaft 46, and, therefore, the drag conveyor 43 in a clockwise direction, as viewed in FIG. 2.

The size of the sprocket wheels in the drive mechanism 58 in the machine 1 is preferably such that during operation of the machine 1 the shafts 54 and 56, and, therefore, the cutter cylinder 44 and the conveyor drum 45 rotate several times faster than the shaft 46 driving the drag conveyor 43, so that the peripheral speeds of the cutter cylinder 44 and the conveyor drum 45 are considerably greater than the linear speed of the drag bars 53 over the bottom wall 10 of the box 5. For example, in a machine wherein the drag bars 53 move at a speed of ten feet per minute during an operation of the machine 1, and wherein the outside diameter of the cutter cylinder 44 is twelve inches, and the outside diameter of the conveyor drum 45 is twenty-four inches, it is preferred that the cutter cylinder 44 rotate at a speed in the order of two-hundred and fifty revolutions per minute, and that the conveyor drum 45 rotate at a speed in the order of two-hundred revolutions per minute.

The drag conveyor 43, the cutter cylinder 44, and the conveyor drum 45 are so constituted and arranged that when a shock of sesame, or the like, is being fed from the front end of the box 5 rearwardly therethrough, the shock is moved by the drag conveyor 43 along the upper surface of the top panel 11 of the floor 10 under the cutter cylinder 44, where the twine binding the individual bundles is cut and the shock, including the individual bundles, is cut into pieces of a sufficiently small size that they may be subsequently readily handled by the elevating and separating mechanisms of the combine 3. As the thus cut up shock passes off from the rear end of the drag conveyor 43, after passing under the cutter drum 44, it passes under the conveyor drum 45 and is fed thereby inwardly toward the longitudinal center thereof and rearwardly outwardly through the opening 42 into the throat 2 of the combine 3, where it is picked up by the elevating mechanism 4 and fed into the separating mechanism of the combine 3.

In the operation of the machine 1, a combine operator positioned on the platform 33, may drive the combine 3, with the machine 1 mounted in operative position thereon, and with the loading fork 6 disposed in the aforementioned fully lowered position, to a shock of sesame, or the like, standing in a field, and advance the loading fork 6 under the shock so that the shock is disposed on the loading fork 6 in a position similar to that of the shock 77 shown in FIG. 2. Thereafter, without leaving the platform 33, the operator may manually actuate the valve 32 to thereby cause hydraulic fluid to be fed into the front end portions of the cylinders 24 and 25 and fed out from the rear end portions of the cylinders 24 and 25, to thereby cause the pistons 28 and 29 to be moved into fully retracted position in the cylinders 24 and 25, respectively. The movement of the pistons 28 and 29 into fully retracted position is effective to tilt the loading fork 6 upwardly and rearwardly into a position such as that shown in FIG. 1, which is effective to dump the shock 7 onto the front end portion of the floor 10 of the box 5 forwardly of the cutter cylinder 44.

During such operation of the machine 1 the drag conveyor 43, the cutter cylinder 44 and the conveyor drum 45 are being driven by the pulley 59, and, therefore, the drag conveyor 43 is effective to move the shock thus dumped on the front end portion of the floor 10 rearwardly under the cutter cylinder 44. As the shock passes under the cutter cylinder 44, the cutter blades 55, which are effective to cut the twine on the individual bundles in the shock 77, break up the shock 77, and sever the bundles into pieces of relatively small size.

Thereafter, the drag conveyor 43 advances the thus severed shock 77 from the cutter cylinder 44 into position beneath the conveyor drum 45. The conveyor drum 45 then feeds the thus severed shock into the throat 2 of the combine 3, where it is moved by the elevating mechanism 4 into the separating mechanism of the combine 3. The operator on the platform 33 may then actuate the valve 32 to again dispose the loading fork 6 in fully lowered position, and drive the combine 3 into position to dispose another shock on the loading fork 6. Thereafter, the abovedescribed cycle of operation of the machine 1 may be repeated.

Thus, it will be seen that the present invention affords a novel attachment for use on one-man operated combines, and the like, which is effective to enable shocks of seed crops, such as sesame, and the like, to be picked up from a field and fed into a combine as a one-man operation.

Also, it will be seen that the present invention affords novel harvesting machinery which is practical and efficient in operation, and which may be readily and economically produced commercially.

Thus, while we have illustrated and described the preferred embodiment of our invention, it is to be understood that this is capable of variation and modification, and we therefor do not wish to be limited to the precise details set forth, but desire to avail ourselves of such changes and alterations as fall within the purview of the following claims.

We claim:

1. Harvesting machinery for use on a combine having separating means, drive means, and feed means for feeding material to said separating means, said machinery comprising
   (a) a box having
      (1) a front end,
      (2) a rear end having an opening therethrough, and
      (3) a floor,
   (b) means on said box for mounting it in operative position on such a combine with said feed means disposed in position to receive material from said box through said opening,
   (c) a loading fork
      (1) mounted on said front end for pivotal movement around a horizontal transverse axis between
         (a') a lowered position for picking up a shock of seed grain from the ground, and
         (b') a raised position for dumping said shock from said fork into the front end portion of said box,
   (d) means operatively connected to said fork for moving said fork between said positions,
   (e) means for feeding said shock from said front end portion rearwardly through said opening to said feed means,
   (f) said means for feeding including
      (1) a drag conveyor rotatable around a portion of said floor in position to move said shock along a path of movement from said front end portion toward said opening,
      (2) a rotatable cutter drum extending across said box, above said drag conveyor and transversely to said path of movement, in position to cut said shock into smaller pieces during movement of said shock along said path of movement when said cutter drum is rotating, and
      (3) a rotatable conveyor drum (a′) extending across said box rearwardly of said cutter drum and in substantially parallel relation thereto, and (b′) having means thereon for feeding said shock from said drag conveyor inwardly toward the longitudinal center of said conveyor drum and outwardly through said opening during rotation of said conveyor drum, and (g) means for simultaneously rotating said drag conveyor, said cutter drum and said conveyor drum.

2. A harvesting machine as defined in claim 1, and in which (a) said means for rotating includes drive means
(1) mounted on the outside of said box,
(2) operatively connected to said drag conveyor, said cutter drum and said conveyor drum, and
(3) adapted to be operatively connected to said first-mentioned drive means for rotation thereby.

3. In a combine having drive means, separator means, a throat portion having an open front end portion for receiving grain to be separated, elevator means for feeding said grain from said throat portion to said separator means, and a station for an operator, the combination of (a) a box having
(1) a front end,
(2) a rear end,
(3) a rear wall extending transversely across said rear end, and
(4) a floor, (b) said rear wall
(1) having an opening through the central portion thereof, and
(2) being mounted on said throat portion with said opening disposed in such position relative to said throat portion to permit feeding of material from said box through said opening into said throat portion, (c) a loading fork
(1) mounted on said front end of said box, for pivotal movement around a horizontal transverse axis between
(a′) a lowered position for picking up a shock of seed grain from the ground, and
(b′) a raised position for dumping said shock from said fork into the front end portion of said box, (d) means operatively connected to said fork for moving said fork between said positions, and (e) means for feeding said shock from said front end portion rearwardly through said opening to said feed means, (f) said means for feeding including
(1) a drag conveyor rotatable around a portion of said floor in position to move said shock along said floor through a path of movement from said front end portion toward said opening,
(2) a rotatable cutter drum extending across said box, above said drag conveyor and transversely to said path of movement in position to separate said shock and cut said shock into smaller pieces during movement of said shock along said path of movement when said cutter drum is rotating, and
(3) a rotatable conveyor drum
(a′) extending across said box rearwardly of said cutter drum and in substantially parallel relation thereto, and
(b′) having means thereon for feeding said shock from said drag conveyor inwardly toward the longitudinal center of said conveyor drum and outwardly through said opening during rotation of said conveyor drum, (g) means operatively connecting said drag conveyor, said cutter drum and said conveyor drum to said drive means for simultaneous rotation thereby, and (h) means mounted at said station for controlling said movement of said fork between said positions.

4. A harvesting machine for use on a combine having separating means, drive means, and feed means for feeding material to said separating means, said machinery comprising (a) a box having
(1) a front end, and
(2) a rear end having an opening therethrough, (b) means on said box for mounting it in operative position on such a combine with said feed means disposed in position to receive material from said box through said opening, (c) a loading fork
(1) mounted on said front end for pivotal movement around a horizontal transverse axis between
(a′) a lowered position for picking up a shock of a plurality of twine-tied bundles of seed grain from the ground, and
(b′) a raised position for dumping said shock from said fork directly into the front end portion of said box, (d) means operatively connected to said fork for moving said fork between said positions and (e) means for feeding said shock from said front end portion rearwardly through said opening to said feed means, (f) said means for feeding including
(1) elongated conveyor means extending rearwardly in said box from said front end portion for moving said shock from said front end portion toward said opening,
(2) cutter means comprising a rotatable drum having a helical-shaped cutter blade projecting radially therefrom rotatably mounted in said box in position to cut said twine on said bundles and to cut said bundles into pieces during said movement of said shock by said conveyor means, and
(3) other conveyor means disposed in said box rearwardly of said cutter means for feeding said shock from said first-mentioned conveyor means outwardly through said opening.

References Cited by the Examiner

UNITED STATES PATENTS

| 1,124,453 | 1/1915 | James | 56—27 |
| 1,897,491 | 2/1933 | Parks | 130—1 |
| 2,150,976 | 3/1939 | Kilberger | 130—1 |
| 2,230,018 | 1/1941 | Stromstad | 130—1 |
| 2,589,318 | 3/1952 | Ahlmeyer | 130—1 |
| 2,832,187 | 4/1958 | Johnson | 56—2C |

ABRAHAM G. STONE, *Primary Examiner.*

T. GRAHAM CRAVER, ANTONIO F. GUIDA,
*Examiners.*